US010126639B2

(12) United States Patent
Dong

(10) Patent No.: US 10,126,639 B2
(45) Date of Patent: Nov. 13, 2018

(54) IMAGE DISPLAY METHOD USING LIGHT-SPLITTING DEVICE TO SPLIT LIGHT BEAM AND IMAGE DISPLAY SYSTEM INCLUDING LIGHT-SPLITTING DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventor: Hui Dong, Beijing (CN)

(73) Assignees: BOE TECHNOLOGY GROUP CO., LTD. (CN); HEFEI XINSHENG OPTOELECTRONICS TECHNOLOGY CO., LTD. (CN)

( * ) Notice: Subject to any disclaimer, the term of this patent is extended or adjusted under 35 U.S.C. 154(b) by 0 days.

(21) Appl. No.: 15/658,538

(22) Filed: Jul. 25, 2017

(65) Prior Publication Data
US 2018/0059524 A1 Mar. 1, 2018

(30) Foreign Application Priority Data

Aug. 26, 2016 (CN) .......................... 2016 1 0741662

(51) Int. Cl.
*G03B 21/20* (2006.01)
*G02B 27/14* (2006.01)
(Continued)

(52) U.S. Cl.
CPC ......... *G03B 21/208* (2013.01); *G02B 27/144* (2013.01); *G03B 21/005* (2013.01);
(Continued)

(58) Field of Classification Search
CPC .......................... G03B 21/208; G03B 21/005; G03B 21/2066; G03B 21/28; G03B 21/60; G02B 27/144
See application file for complete search history.

(56) References Cited

U.S. PATENT DOCUMENTS 4,989,076 A * 1/1991 Owada ................. H04N 9/3105
345/32
5,283,600 A * 2/1994 Imai ..................... G02B 27/283
348/E9.027
(Continued)

FOREIGN PATENT DOCUMENTS

CN 1157423 A 8/1997
CN 2824079 Y 10/2006
(Continued)

OTHER PUBLICATIONS

First Office Action for Chinese Application No. 201610741662.3, dated Sep. 29, 2017, 7 Pages.

*Primary Examiner* — Sultan Chowdhury
*Assistant Examiner* — Magda Cruz
(74) *Attorney, Agent, or Firm* — Brooks Kushman P.C.

(57) ABSTRACT

The present disclosure provides an image display method and an image display system. The image display system includes a light source, a light-splitting device and n display devices, where n is greater than or equal to 2. The light source is configured to generate an initial light beam and project the initial light beam to the light-splitting device. The light-splitting device is configured to split the initial light beam into n light beams with an identical light intensity and project each light beam to a respective one of the display devices. Each display device is configured to modulate the light beam projected from the light-splitting device, so as to display a predetermined region of a target image. The
(Continued)

predetermined regions displayed by the n display devices are combined into the target image.

18 Claims, 7 Drawing Sheets

(51) Int. Cl.
*G03B 21/00* (2006.01)
*G03B 21/28* (2006.01)
*G03B 21/60* (2014.01)

(52) U.S. Cl.
CPC ......... *G03B 21/2066* (2013.01); *G03B 21/28* (2013.01); *G03B 21/60* (2013.01)

(56) References Cited

U.S. PATENT DOCUMENTS

| | | | |
|---|---|---|---|
| 5,717,472 A | 2/1998 | Lee | |
| 2012/0162609 A1* | 6/2012 | Yamaguchi | G02B 27/26 353/20 |

FOREIGN PATENT DOCUMENTS

| | | | |
|---|---|---|---|
| CN | 1971504 A | 5/2007 | |
| CN | 102073203 A | 5/2011 | |
| CN | 102087420 A | 6/2011 | |
| CN | 102162982 A | 8/2011 | |
| CN | 103531175 A | 1/2014 | |

* cited by examiner

IMAGE DISPLAY METHOD USING LIGHT-SPLITTING DEVICE TO SPLIT LIGHT BEAM AND IMAGE DISPLAY SYSTEM INCLUDING LIGHT-SPLITTING DEVICE

CROSS-REFERENCE TO RELATED APPLICATION

The present application claims a priority of the Chinese patent application No. 201610741662.3 filed on Aug. 26, 2016, which is incorporated herein by reference in its entirety.

TECHNICAL FIELD

The present disclosure relates to the field of display technology, in particular to an image display method and an image display system.

BACKGROUND

As an all-digital display technology for generating digital, multi-light-source display using an optical semiconductor, a Digital Light Processing (DLP) technology has been applied to various products (e.g., a large-screen digital television, a conference projector or a digital camera), so as to display an image at high quality.

In the related art, a DLP-based image display system includes a plurality of display devices. Each display device includes a light source, an optical mechanism and a screen. In each display device, the optical mechanism is configured to receive a light beam (a white light beam) from the light source, modulate the light beam, and project the modulated light beam to the screen. Then, regions displayed on the screens are combined into a complete image.

In the above-mentioned system, a separate light source is adopted by each display device, so the images displayed on the screens of different display devices may be different from each other in terms of brightness and chromaticity, and thereby an image display effect may be adversely affected.

SUMMARY

An object of the present disclosure is to provide an image display method and an image display device, so as to improve the image display effect.

In one aspect, the present disclosure provides in some embodiments an image display system, including a light source, a light-splitting device and n display devices, n being an integer greater than or equal to 2. The light source is configured to generate an initial light beam and project the initial light beam to the light-splitting device. The light-splitting device is configured to split the initial light beam into n light beams with an identical light intensity and project each light beam to a respective one of the n display devices. Each display device is configured to modulate the light beam projected from the light-splitting device, so as to display a predetermined region of a target image. The predetermined regions displayed by the n display devices are combined into the target image.

In a possible embodiment of the present disclosure, the light-splitting device includes at least one light-splitting assembly arranged sequentially in a predetermined direction. A first light-splitting assembly of the at least one light-splitting assembly is configured to split a first transmission light beam generated from a second light-splitting assembly of the at least one light-splitting assembly into a first reflection light beam and a second transmission light beam, project the first reflection light beam to the corresponding display device, and project the second transmission light beam to a third light-splitting assembly. The first light-splitting assembly is any one of the at least one light-splitting assembly other than a first-place light-splitting assembly and a last-place light-splitting assembly. A distance between the first light-splitting assembly and the light source, a distance between the second light-splitting assembly and the light source and a distance between the third light-splitting assembly and the light source meet the following condition: $b<a<c$, where a represents the distance between the first light-splitting assembly and the light source, b represents the distance between the second light-splitting assembly and the light source, and c represents the distance between the third light-splitting assembly and the light source.

In a possible embodiment of the present disclosure, each light-splitting assembly is a beam splitter, and in the case that the light-splitting device includes one beam splitter, a ratio of transmissivity to reflectivity of the beam splitter is equal to 1.

In a possible embodiment of the present disclosure, each light-splitting assembly is a beam splitter, and in the case that the light-splitting device includes at least two beam splitters, a ratio of transmissivity to reflectivity of each beam splitter is not equal to 1, and the reflection light beams from the beam splitters have an identical light intensity.

In a possible embodiment of the present disclosure, the system further includes a light-path conversion device configured to convert a light path of a transmission light beam from the last-place light-splitting assembly of the at least one light-splitting assembly, and project the transmission light beam whose light path has been converted to the corresponding display device.

In a possible embodiment of the present disclosure, each display device includes a light-beam modulation assembly, a light-path conversion assembly and an image display assembly. The light-beam modulation assembly is configured to modulate the light beam projected from the light-splitting device and project the modulated light beam to the light-path conversion assembly. The light-path conversion assembly is configured to convert a light path of the modulated light beam, and project the modulated light beam whose light path has been converted to the image display assembly. The image display assembly is configured to display the predetermined region of the target image in accordance with the modulated light beam whose light path has been converted.

In a possible embodiment of the present disclosure, the light-beam modulation assembly is an optical mechanism, and the light-path conversion assembly is a reflector.

In a possible embodiment of the present disclosure, the optical mechanism is of a single digital micromirror device structure or a triple liquid crystal display structure.

In a possible embodiment of the present disclosure, the image display assembly includes a screen provided with a reflector which is configured to reflect a light beam corresponding to the predetermined region of the target image displayed on the screen toward human eyes.

In a possible embodiment of the present disclosure, the light source is a high-pressure mercury lamp, a metal halid lamp, a light-emitting diode (LED) lamp or a laser-excited fluorescent lamp.

In another aspect, the present disclosure provides in some embodiments an image display method, including steps of:

splitting, by a light-splitting device, an initial light beam from a light source into n light beams with an identical light intensity, n being an integer greater than or equal to 2; projecting, by the light-splitting device, each of the light beams to a respective one of n display devices; and modulating, by each display device, the light beam projected from the light-splitting device, so as to display a predetermined region of a target image, the predetermined regions displayed by the n display devices being combined into the target image.

In a possible embodiment of the present disclosure, the light-splitting device includes at least one light-splitting assembly arranged sequentially in a predetermined direction. The step of splitting, by the light-splitting device, the initial light beam from the light source includes: splitting, by a first light-splitting assembly of the at least one light-splitting assembly, a first transmission light beam generated from a second light-splitting assembly of the at least one light-splitting assembly into a first reflection light beam and a second transmission light beam, the first transmission light beam being generated by the second light-splitting assembly in accordance with the initial light beam; projecting, by the first light-splitting assembly, the first reflection light beam to the corresponding display device; and projecting, by the first light-splitting assembly, the second transmission light beam to a third light-splitting assembly. The first light-splitting assembly is any one of the at least one light-splitting assembly other than a first-place light-splitting assembly and a last-place light-splitting assembly. A distance between the first light-splitting assembly and the light source, a distance between the second light-splitting assembly and the light source and a distance between the third light-splitting assembly and the light source meet the following condition: b<a<c, where a represents the distance between the first light-splitting assembly and the light source, b represents the distance between the second light-splitting assembly and the light source, and c represents the distance between the third light-splitting assembly and the light source.

In a possible embodiment of the present disclosure, each light-splitting assembly is a beam splitter, and in the case that the light-splitting device includes one beam splitter, a ratio of transmissivity to reflectivity of the beam splitter is equal to 1.

In a possible embodiment of the present disclosure, each light-splitting assembly is a beam splitter. In the case that the light-splitting device includes at least two beam splitters, a ratio of transmissivity to reflectivity of each beam splitter is not equal to 1, and the reflection light beams from the beam splitters have an identical light intensity.

In a possible embodiment of the present disclosure, in the case that the third light-splitting assembly is the last-place light-splitting assembly of the at least one light-splitting assembly, the step of projecting, by the light-splitting device, each of the light beams to the respective one of the n display devices includes: converting, by a light-path conversion device, a light path of a transmission light beam from the third light-splitting assembly, and projecting the transmission light beam whose light path has been converted to the corresponding display device.

In a possible embodiment of the present disclosure, each display device includes a light-beam modulation assembly, a light-path conversion assembly and an image display assembly. The step of modulating, by each display device, the light beam projected from the light-splitting device so as to display the predetermined region of the target image includes: modulating, by the light-beam modulation assembly, the light beam projected from the light-splitting device so as to acquire a modulated light beam; projecting, by the light-beam modulation assembly, the modulated light beam to the light-path conversion assembly; converting, by the light-path conversion assembly, a light path of the modulated light beam; projecting, by the light-path conversion assembly, the modulated light beam whose light path has been converted to the image display assembly; and displaying, by the image display assembly, the predetermined region of the target image in accordance with the modulated light beam whose light path has been converted.

In a possible embodiment of the present disclosure, the light-beam modulation assembly is an optical mechanism, and the light-path conversion assembly is a reflector.

In a possible embodiment of the present disclosure, the optical mechanism is of a single digital micromirror device structure or a triple liquid crystal display structure.

In a possible embodiment of the present disclosure, the image display assembly includes a screen provided with a reflector. The step of displaying, by the image display assembly, the predetermined region of the target image in accordance with the modulated light beam whose light path has been converted includes: displaying on the screen the predetermined region of the target image in accordance with the modulated light beam whose light path has been converted. Subsequent to the step of displaying on the screen the predetermined region of the target image in accordance with the modulated light beam whose light path has been converted, the method further includes: reflecting, by the reflector of the screen, a light beam corresponding to the predetermined region of the target image displayed on the screen toward human eyes.

In a possible embodiment of the present disclosure, the light source is a high-pressure mercury lamp, a metal halid lamp, a light-emitting diode (LED) lamp or a laser-excited fluorescent lamp.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
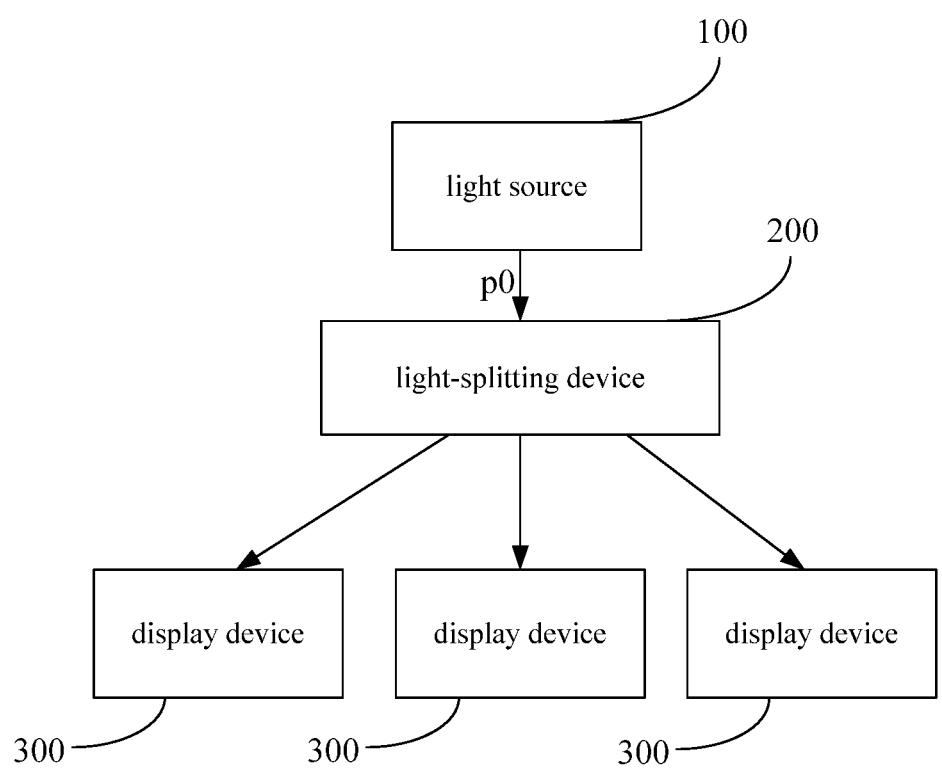
FIG. 1 is a schematic view showing an image display system according to one embodiment of the present disclosure.

The present disclosure provides in some embodiments an image display system which, as shown in FIG. 1, includes a light source 100, a light-splitting device 200 and n display devices 300, n being an integer greater than or equal to 2. The light source 100 is configured to generate an initial light beam p0 and project the initial light beam p0 to the light-splitting device 200. The light-splitting device 200 is configured to split the initial light beam p0 into n light beams with an identical light intensity and project each light beam to a respective one of the n display devices 300. Each display device 300 is configured to modulate the light beam projected from the light-splitting device 200, so as to display a predetermined region of a target image. The predetermined regions displayed by the n display devices 300 are combined into the target image.

According to the image display system in the embodiments of the present disclosure, the light-splitting device is capable of splitting the initial light beam from the light source into n light beams with an identical light intensity, and projecting each light beam to a respective one of the n display devices. The display devices may share an identical light source, so it is able to prevent regions displayed by screens of different display devices from being different from each other in terms of brightness and chromaticity due to the separate light sources adopted by the display devices. As compared with the related art, it is able to improve the uniformity of the brightness and chromaticity of the regions, thereby to improve an image display effect.

For example, the light source may be a high-pressure mercury lamp, a metal halid lamp, an LED lamp or a laser-excited fluorescent lamp. A fluorescent material may be one selected from a group including silicate, chlorosilicate, aluminate, oxynitride, nitride, tungstate, oxysulfide, and etc.

To be specific, the light-splitting device includes at least one light-splitting assembly arranged sequentially in a predetermined direction. A first light-splitting assembly of the at least one light-splitting assembly is configured to split a first transmission light beam generated from a second light-splitting assembly of the at least one light-splitting assembly into a first reflection light beam and a second transmission light beam, project the first reflection light beam to the corresponding display device, and project the second transmission light beam to a third light-splitting assembly. The first light-splitting assembly is any one of the at least one light-splitting assembly other than a first-place light-splitting assembly and a last-place light-splitting assembly. A distance between the first light-splitting assembly and the light source, a distance between the second light-splitting assembly and the light source and a distance between the third light-splitting assembly and the light source meet the following condition: b<a<c, where a represents the distance between the first light-splitting assembly and the light source, b represents the distance between the second light-splitting assembly and the light source, and c represents the distance between the third light-splitting assembly and the light source.

Figure 2:
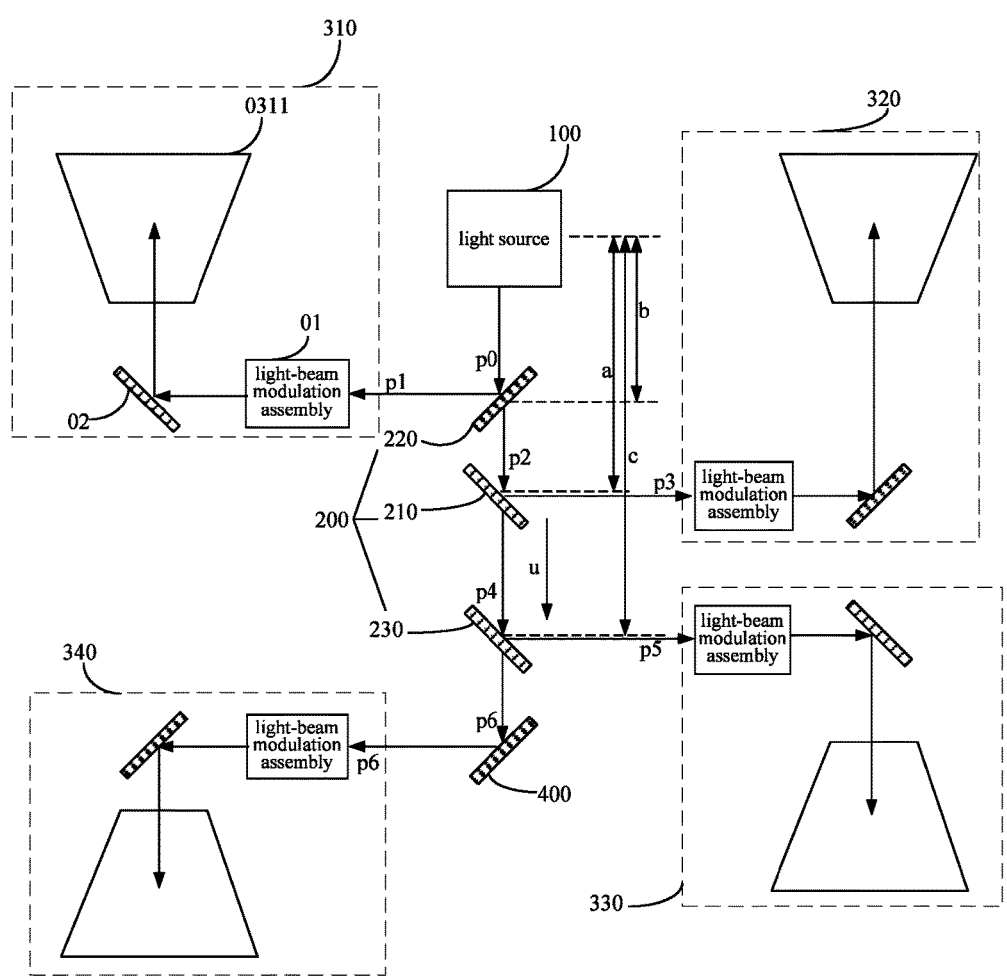
FIG. 2 is another schematic view showing the image display system according to one embodiment of the present disclosure.

For example, in the case that the light-splitting device includes three light-splitting assemblies arranged sequentially in the predetermined direction, as shown in FIG. 2, the image display system may include the light source 100, the light-splitting device 200 and four display devices (i.e., a first display device 310, a second display device 320, a third display device 330 and a fourth display device 340). The light-splitting device 200 includes three light-splitting assemblies arranged sequentially in the predetermined direction (a direction indicated by u in FIG. 2), i.e., a second light-splitting assembly 220, a first light-splitting assembly 210 and a third light-splitting assembly 230. A distance a between the first light-splitting assembly 210 and the light source 100 is greater than a distance b between the second light-splitting assembly 220 and the light source 100 and smaller than a distance c between the third light-splitting assembly 230 and the light source 100. For example, the second light-splitting assembly 220, the first light-splitting assembly 210 and the third light-splitting assembly 230 are beam splitters, each of which may not be a polarization beam splitter. A ratio of transmissivity to reflectivity of each beam splitter may be not equal to 1, and the reflection beams generated by the beam splitters may have an identical light intensity. In FIG. 2, a ratio of transmissivity to reflectivity of the second light-splitting assembly 220 is 3:1, a ratio of transmissivity to reflectivity of the first light-splitting assembly 210 is 2:1 m, and a ratio of transmissivity to reflectivity of the third light-splitting assembly 230 is 1:1. As a result, in the case that the light intensity of the initial light beam p0 from the light source 100 is represented by 1, the reflection light beams from the second light-splitting assembly 220, the first light-splitting assembly 210 and the third light-splitting assembly 230 may each have light intensity of ¼.

Referring to FIG. 2, the light source 100 may generate the initial light beam p0 (a white light beam) and project the initial light beam p0 to the second light-splitting assembly 220. The second light-splitting assembly 220 may split the initial light beam p0, i.e., allow one fourth of the initial light beam p0 to be reflected to acquire a second reflection light beam p1 and allow three fourths of the initial light beam p0 to be transmitted therethrough to acquire a first transmission light beam p2. Next, the second light-splitting assembly 220 may project the second reflection light beam p1 to the first display device 310, and project the first transmission light beam p2 to the first light-splitting assembly 210. Next, the first light-splitting assembly 210 may split the first transmission light beam p2, i.e., allow one third of the first transmission light beam p2 to be reflected to acquire a first reflection light beam p3 and allow two thirds of the first transmission light beam p2 to be transmitted therethrough to acquire a second transmission light beam p4. Next, the first light-splitting assembly 210 may project the first reflection light beam p3 to the second display device 320 and project the second transmission light beam p4 to the third light-splitting assembly 230. Then, the third light-splitting assembly 230 may split the second transmission light beam p4, i.e., allow a half of the second transmission light beam p4 to be reflected to acquire a third reflection light beam p5 and allow the other half of the second transmission light beam p4 to the transmitted therethrough to acquire a third transmission light beam p6. Finally, the third light-splitting assembly 230 may project the third reflection light beam p5 to the third display device 330 and project the third transmission light beam p6 to the fourth display device 340. The first display device 310, the second display device 320, the third display device 330 and the fourth display device 340 may display the predetermined regions of the target image respectively.

As shown in FIG. 2, the image display system further includes a light-path conversion device 400 configured to convert a light path of a transmission light beam (i.e. the third transmission light beam p6) from the last-place light-splitting assembly (i.e., the third light-splitting assembly 230) of the at least one light-splitting assembly, and project the transmission light beam whose light path has been converted to the fourth display device 340. For example, the light-path conversion device 400 may be a reflector.

As shown in FIG. 2, each display device includes a light-beam modulation assembly 01, a light-path conversion assembly 02 and an image display assembly (not shown). The light-beam modulation assembly 01 is configured to modulate the light beam projected from the light-splitting device, and project the modulated light beam to the light-path conversion assembly 02. For example, the light-beam modulation assembly may be an optical mechanism, which may be of a single-chip structure, e.g., a single Digital Micromirror Device (DMD) structure, or a triple-chip structure, e.g., a triple Liquid Crystal Display (LCD) structure.

The light-path conversion assembly 02 is configured to convert a light path of the modulated light beam, and project the modulated light beam whose light path has been converted to the image display assembly. For example, the light-path conversion assembly may be a reflector.

The image display assembly is configured to display the predetermined region of the target image in accordance with the modulated light beam whose light path has been converted. To be specific, the image display assembly includes a screen (not shown in FIG. 2) provided with a reflector 0311 which is configured to reflect a light beam corresponding to the predetermined region of the target image displayed on the screen toward human eyes, so as to facilitate the viewing of the target image for a user.

Taking the first display device 310 as an example, the second light-splitting assembly 220 may project the second reflection light beam p1 to the light-beam modulation assembly 01 of the first display device 310. Next, the light-beam modulation assembly 01 may modulate the second reflection light beam p1 and project the modulated light beam to the light-path conversion assembly 02. Next, the light-path conversion assembly 02 may convert a light path of the modulated light beam, and project the modulated light beam whose light path has been converted to the screen of the image display assembly. Finally, the reflector 0311 of the screen may reflect the light beam corresponding to the predetermined region of the target image displayed on the screen to human eyes.

Figure 3:
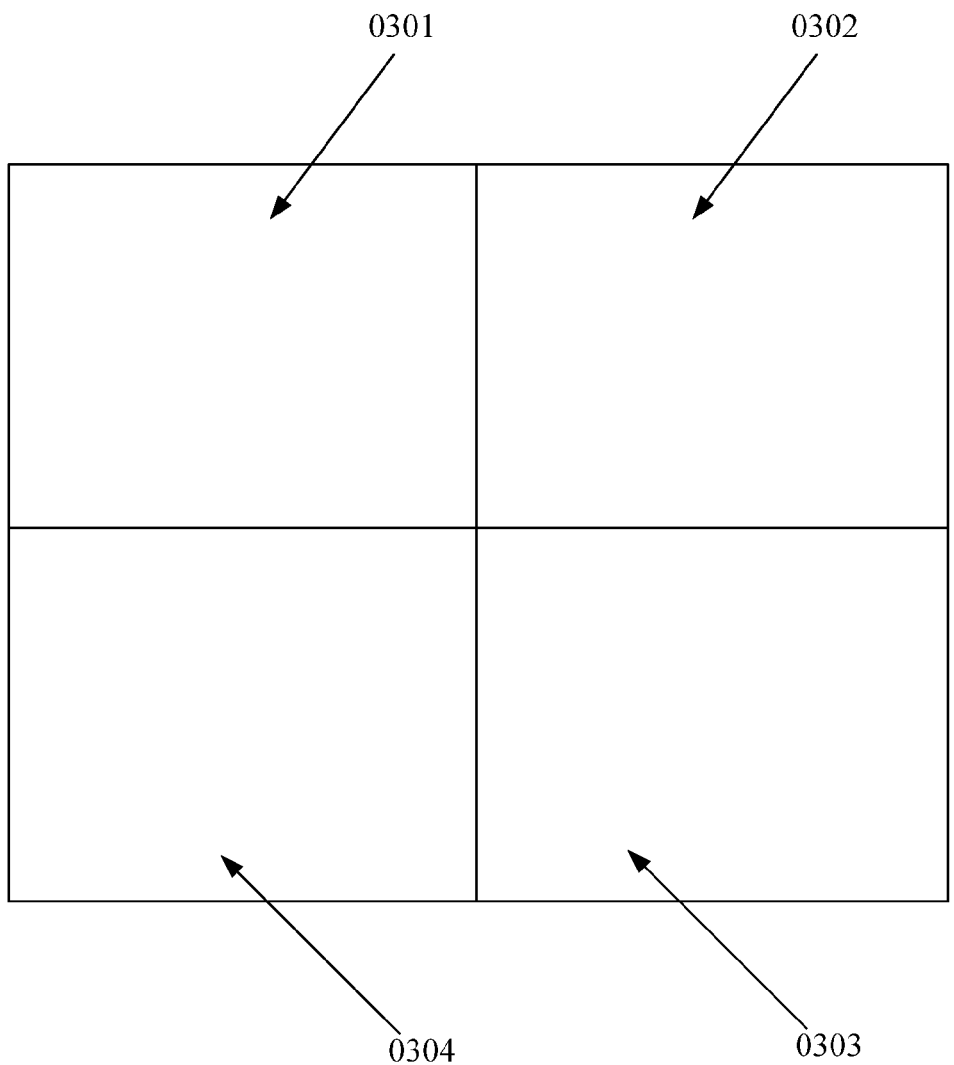
FIG. 3 is a schematic view showing the arrangement of screens of image display assemblies of display devices in FIG. 2.

FIG. 3 is a schematic view showing the arrangement of the screens of the image display assemblies in the display devices in FIG. 2. A first screen 0301 of the first display device is configured to display thereon an upper-left region of the target image, a second screen 0302 of the second display device is configured to display thereon an upper-right region of the target image, a third screen 0303 of the third display device is configured to display thereon a lower-right region of the target image, and a fourth screen 0304 of the fourth display device is configured to display a lower-left region of the target image. Images displayed on the first screen 0303, the second screen 0302, the third screen 0303 and the fourth screen 0304 may be combined into a complete image.

Because the first display device 310, the second display device 320, the third display device 330 and the fourth display device 340 of FIG. 2 share the same light source 100, it is able to prevent the regions from being different from each other in terms of brightness and chromaticity due to different light sources in the related art, thereby to improve the uniformity of the brightness and chromaticity of the regions, and improve the image display effect.

Figure 4:
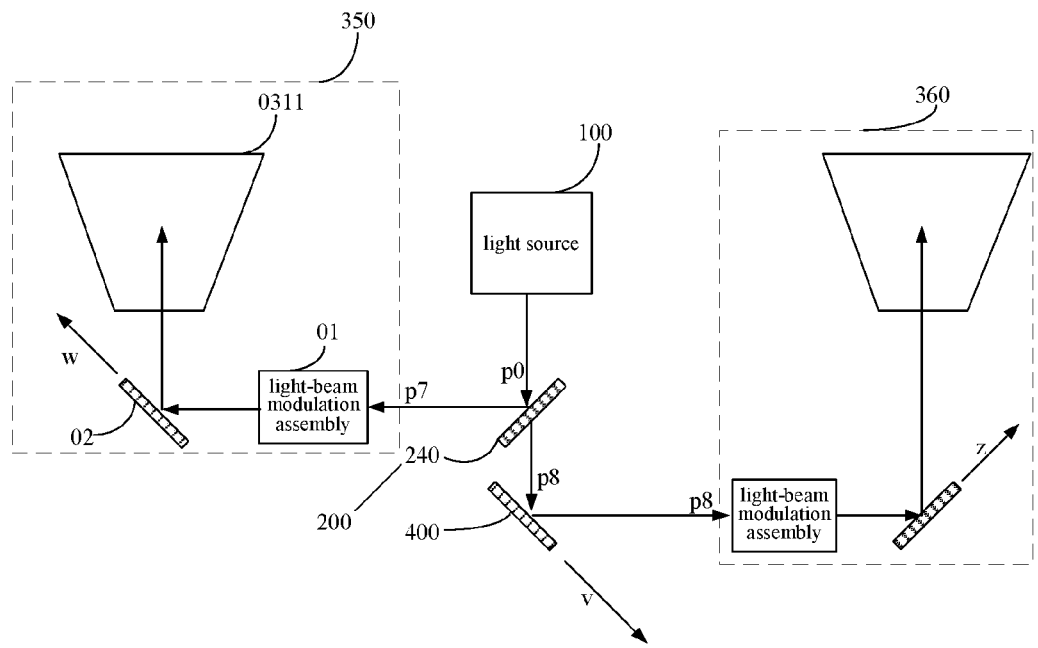
FIG. 4 is yet another schematic view showing the image display system according to one embodiment of the present disclosure.

For example, in the case that the light-splitting device merely includes one light-splitting assembly, as shown in FIG. 4, the image display system may include the light source 100, the light-splitting device 200 and two display devices 300, i.e., a fifth display device 350 and a sixth display device 360. The light-splitting device 200 may include one light-splitting assembly, i.e., a fourth light-splitting assembly 240. For example, the fourth light-splitting assembly 240 may be a beam splitter. A ratio of transmissivity to reflectivity of the beam splitter may be 1, i.e., the transmissivity and the reflectivity of the fourth light-splitting assembly 240 may each be ½. In the case that the light intensity of the initial light beam p0 from the light source 100 is represented by 1, the light intensity of the reflection light beam and the light intensity of the transmission light beam from the fourth light-splitting assembly 240 may each be ½.

Referring to FIG. 4, the light source 100 may generate the initial light beam p0 (a white light beam) and project the initial light beam p0 to the fourth light-splitting assembly 240. Next, the fourth light-splitting assembly 240 may split the initial light beam p0, i.e., allow a half of the initial light beam p0 to be reflected to acquire a fourth reflection light beam p7 and allow the other half of the initial light beam p0 to be transmitted therethrough to acquire a fourth transmission light beam p8. Next, the fourth light-splitting assembly 240 may project the fourth reflection light beam p7 to the fifth display device 350 and project the fourth transmission light beam p8 to the sixth display device 360. The fifth display device 350 and the sixth display device 360 may display the predetermined regions of the target image respectively.

As shown in FIG. 4, the image display system may further include the light-path conversion device 400 configured to convert a light path of the fourth transmission light beam p8 from the fourth light-splitting assembly 240, and project the converted fourth transmission light beam p8 to the sixth display device 360. For example, the light-path conversion device may be a reflector arranged at a position as shown in FIG. 4, where a lengthwise direction of the reflector (i.e., a direction indicated by v in FIG. 4) may be parallel to the plane of FIG. 4, and an angle between the lengthwise direction of the reflector and an emergent direction of the fourth transmission light beam p8 may be 45°.

The fifth display device 350 and the sixth display device 360 may each include the light-beam modulation assembly 01, the light-path conversion assembly 02 and the image display assembly. The light-beam modulation assembly 01 is configured to modulate the light beam projected from the light-splitting device and project the modulated light beam to the light-path conversion assembly 02. The light-path conversion assembly 02 is configured to convert a light path of the modulated light beam, and project the modulated light beam whose light path has been converted to the image display assembly. For example, the light-path conversion assembly may be a reflector. The reflector of the fifth display device 350 may be arranged at a position as shown in FIG. 4, where a lengthwise direction of the reflector (i.e., a direction indicated by w in FIG. 4) may be parallel to the plane of FIG. 4, and an angle between the lengthwise direction of the reflector and an emergent direction of the fourth reflection light beam p7 may be 45°. The reflector of the sixth display device 360 may be arranged at a position as shown in FIG. 4, where a lengthwise direction of the reflector (i.e., a direction indicated by z in FIG. 4) may be parallel to the plane of FIG. 4, and an angle between the lengthwise direction of the reflector and an emergent direction of the fourth transmission light beam p8 may be 45°.

The image display assembly is configured to display the predetermined region of the target image in accordance with the modulated light beam whose light path has been converted.

The image display device includes a screen (not shown in FIG. 4) which is provided with the reflector 0311 configured to reflect the light beam corresponding to the predetermined region of the target image displayed on the screen to human eyes, so as to facilitate the viewing of the target image for a user.

Figure 5:
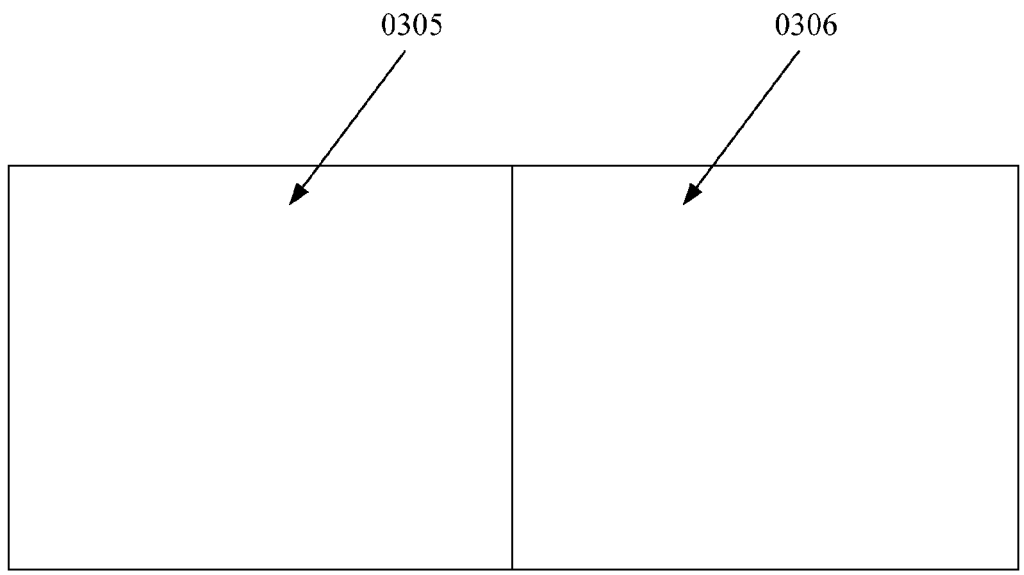
FIG. 5 is a schematic view showing the arrangement of the screens of the image display assemblies of the display devices in FIG. 4.

FIG. 5 is a schematic view showing the arrangement of the screens of the image display assemblies of the display devices in FIG. 4. A fifth screen 0305 of the fifth display device is configured to display thereon a left-half region of the target image, and a sixth screen 0306 of the sixth display device is configured to display thereon a right-half region of the target image. Images displayed on the fifth screen 0305 and the sixth screen 0306 may be spliced into a complete image.

Because the fifth display device 350 and the sixth display device 360 share the same light source 100 in FIG. 4, it is able to prevent the regions from being different from each other in terms of brightness and chromaticity due to different light sources in the related art, thereby to improve the uniformity of the brightness and chromaticity of the regions, and improve the image display effect.

It should be appreciated that, the positions of the light-splitting assemblies, the light-path conversion devices, the light-path conversion assemblies and the reflectors on the screens in the image display system may be determined according to the practical need, and thus will not be particularly defined herein.

In the embodiments of the present disclosure, the image display system for a projector is of a rear-projection mosaic structure. Through this structure, it is able to ensure the uniformity of the brightness and chromaticity of the regions of the images spliced by the image display system, thereby to improve an image splicing effect as well as the image display effect.

According to the image display system in the embodiments of the present disclosure, the light-splitting device is capable of splitting the initial light beam from the light source into n light beams with an identical light intensity, and projecting each light beam to a respective one of the n display devices. The display devices share an identical light source, so it is able to prevent the regions displayed on the screen of different display devices from being different from each other in terms of the brightness and chromaticity due to the separate light sources adopted by different display devices. As compared with the related art, it is able to improve the uniformity of the brightness and chromaticity of the regions, thereby to improve the image display effect. In addition, the image display system is of a simple structure, and thus may be implemented conveniently.

Figure 6A:
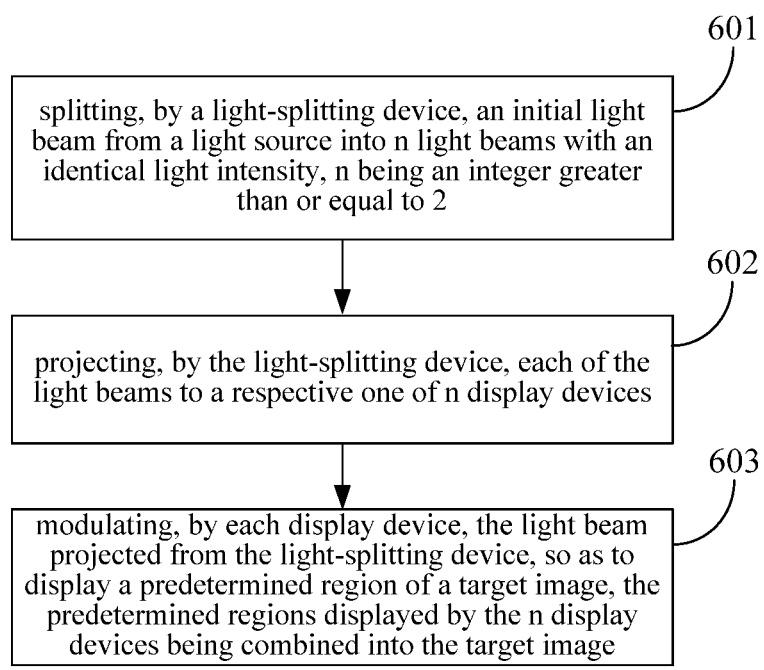
FIG. 6*a* is a flow chart of an image display method according to one embodiment of the present disclosure.

The present disclosure further provides in some embodiments an image display method which, as shown in FIG. 6a, includes: Step 601 of splitting, by a light-splitting device, an initial light beam from a light source into n light beams with an identical light intensity, n being an integer greater than or equal to 2; Step 602 of projecting, by the light-splitting device, each of the light beams to a respective one of n display devices; and Step 603 of modulating, by each display device, the light beam projected from the light-splitting device, so as to display a predetermined region of a target image, the predetermined regions displayed by the n display devices being combined into the target image.

According to the image display method in the embodiments of the present disclosure, the light-splitting device is capable of splitting the initial light beam from the light source into n light beams with an identical light intensity, and projecting each light beam to a respective one of the n display devices. The display devices share an identical light source, so it is able to prevent the regions displayed on the screen of different display devices from being different from each other in terms of the brightness and chromaticity due to the separate light sources adopted by different display devices. As compared with the related art, it is able to improve the uniformity of the brightness and chromaticity of the regions, thereby to improve the image display effect.

Figure 6B:
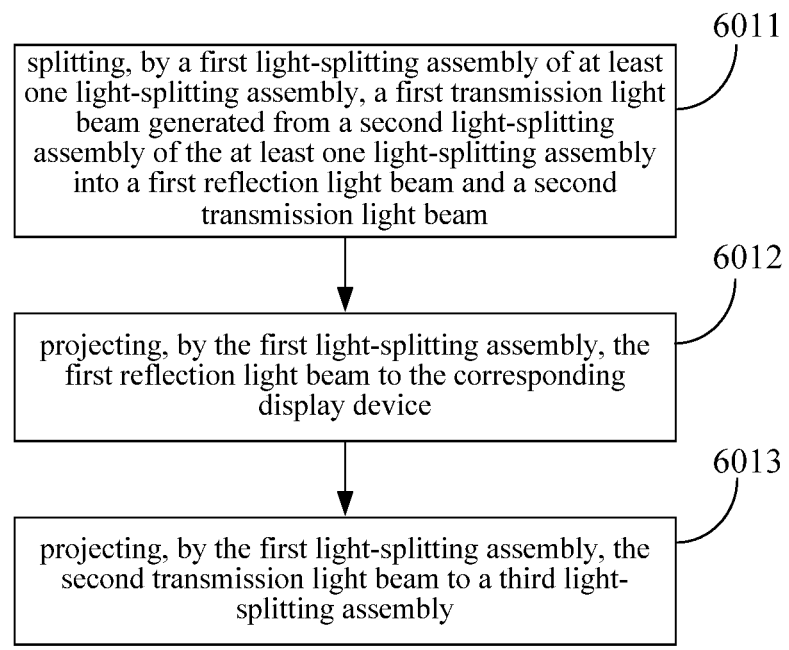
FIG. 6*b* is a flow chart of a splitting operation on an initial light beam from a light source by a light-splitting device according to one embodiment of the present disclosure.

To be specific, the light-splitting device includes at least one light-splitting assembly arranged sequentially in a predetermined direction. Correspondingly, as shown in FIG. 6b, Step 601 may include the following steps.

Step 6011: splitting, by a first light-splitting assembly of the at least one light-splitting assembly, a first transmission light beam generated from a second light-splitting assembly of the at least one light-splitting assembly into a first reflection light beam and a second transmission light beam, the first transmission light beam being generated by the second light-splitting assembly in accordance with the initial light beam.

Taking the image display system in FIG. 2 as an example, the first light-splitting assembly 210 may split the first transmission light beam p2 from the second light-splitting assembly 220, i.e., allow one third of the first transmission light beam p2 to be reflected to acquire the first reflection light beam p3, and allow two third of the first transmission light beam p2 to be transmitted therethrough to acquire the second transmission light beam p4.

Step 6012: projecting, by the first light-splitting assembly, the first reflection light beam to the corresponding display device. Referring to FIG. 2, the first light-splitting assembly 201 may project the first reflection light beam p3 acquired in Step 6011 to the second display device 320.

Step 6013: projecting, by the first light-splitting assembly, the second transmission light beam to a third light-splitting assembly. Referring to FIG. 2, the first light-splitting assembly 210 may project the second transmission light beam p4 to the third light-splitting assembly 230, so as to enable the third light-splitting assembly 230 to continue to split the second transmission light beam p4.

The first light-splitting assembly is any one of the at least one light-splitting assembly other than a first-place light-splitting assembly and a last-place light-splitting assembly. A distance between the first light-splitting assembly and the light source, a distance between the second light-splitting assembly and the light source and a distance between the third light-splitting assembly and the light source meet the following condition: $b<a<c$, where a represents the distance between the first light-splitting assembly and the light source, b represents the distance between the second light-splitting assembly and the light source, and c represents the distance between the third light-splitting assembly and the light source.

For example, the light-splitting assembly may be a beam splitter. As shown in FIG. 4, in the case that the light-splitting device includes merely one beam splitter, a ratio of transmissivity to reflectivity of the beam splitter may be 1. As shown in FIG. 2, in the case that the light-splitting device includes at least two beam splitters, a ratio of transmissivity to reflectivity of each beam splitter may not be 1, and the reflection light beams from the beam splitters may have an identical light intensity.

In the case that the third light-splitting assembly is the last-place light-splitting assembly of the at least one light-splitting assembly, as shown in FIG. 2, the step of projecting, by the light-splitting device, each of the light beams to the respective one of the n display devices includes: converting, by a light-path conversion device, a light path of a transmission light beam from the third light-splitting assembly, and projecting the transmission light beam whose light path has been converted to the corresponding display device. For example, the light-path conversion device may be a reflector.

Figure 6C:
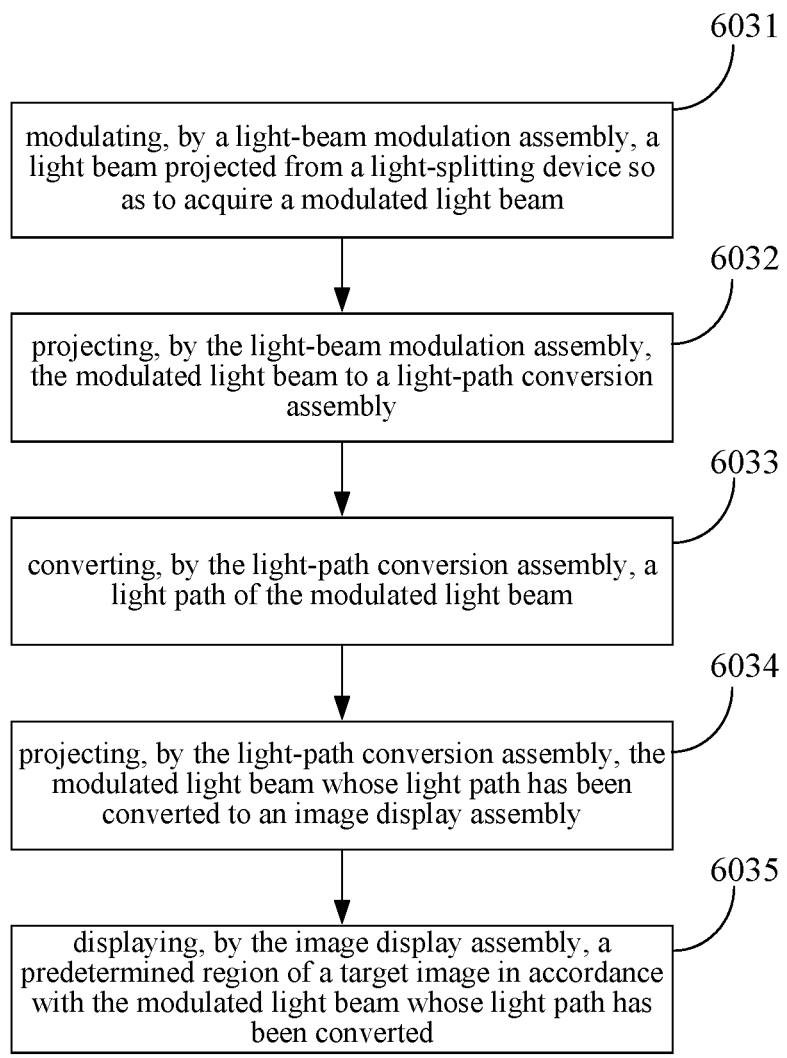
FIG. 6c is a flow chart of a modulation operation on a light beam projected from the light-splitting device by each display device according to one embodiment of the present disclosure.

To be specific, as shown in FIG. 2, each display device includes the light-beam modulation assembly 01, the light-path conversion assembly 02 and the image display assembly. Correspondingly, as shown in FIG. 6c, Step 603 may include the following steps.

Step 6031: modulating, by the light-beam modulation assembly, the light beam projected from the light-splitting device so as to acquire a modulated light beam. Referring to FIG. 2, taking the first display device 310 as an example, the light-beam modulation assembly 01 may modulate the second reflection light beam p1 projected from the second light-splitting assembly 220 so as to acquire the modulated light beam. For example, the light-beam modulation assembly may be an optical mechanism.

Step 6032: projecting, by the light-beam modulation assembly, the modulated light beam to the light-path conversion assembly. Still taking the first display device 310 in FIG. 2 as an example, the light-beam modulation assembly 01 may project the modulated light beam to the light-path conversion assembly 02. For example, the light-path conversion assembly may be a reflector.

Step 6033: converting, by the light-path conversion assembly, a light path of the modulated light beam. Still taking the first display device 310 in FIG. 2 as an example, the light-path conversion assembly 02 may convert the light path of the modulated light beam.

Step 6034: projecting, by the light-path conversion assembly, the modulated light beam whose light path has been converted to the image display assembly. Still taking the first display device 310 in FIG. 2 as an example, the light-path conversion assembly 02 may project the modulated light beam whose light path has been converted to the image display assembly.

Step 6035: displaying, by the image display assembly, the predetermined region of the target image in accordance with the modulated light beam whose light path has been converted. Still taking the first display device 310 in FIG. 2 as an example, after the light-path conversion assembly 02 has projected the modulated light beam whose light path has been converted to the image display assembly, the image display assembly may display the predetermined region of the target image in accordance with the modulated light beam whose light path has been converted.

To be specific, the image display assembly includes a screen provided with a reflector. Correspondingly, Step 6035 may include displaying on the screen the predetermined region of the target image in accordance with the modulated light beam whose light path has been converted. Subsequent to the step of displaying on the screen the predetermined region of the target image in accordance with the modulated light beam whose light path has been converted, the method further includes: reflecting, by the reflector of the screen, a light beam corresponding to the predetermined region of the target image displayed on the screen toward human eyes, so as to facilitate the viewing of the target image for a user.

It should be appreciated that, an order of the above steps of the image display method may be adjusted appropriately. In addition, depending on the actual situation, some steps may be omitted or any other appropriate steps may also be added, which also fall within the scope of the present disclosure.

According to the image display method in the embodiments of the present disclosure, the light-splitting device is capable of splitting the initial light beam from the light source into n light beams with an identical light intensity, and projecting each light beam to a respective one of the n display devices. The display devices share an identical light source, so it is able to prevent the regions displayed on the screen of different display devices from being different from each other in terms of the brightness and chromaticity due to the separate light sources adopted by different display devices. As compared with the related art, it is able to improve the uniformity of the brightness and chromaticity of the regions, thereby to improve the image display effect.

It should be further appreciated that, for convenience and concision, the implementation of the method may refer to that of the system, and thus will not be particularly defined herein.

The above are merely the preferred embodiments of the present disclosure, but the present disclosure is not limited thereto. Obviously, a person skilled in the art may make further modifications, substitutions and improvements without departing from the spirit of the present disclosure, and these modifications, substitutions and improvements shall also fall within the scope of the present disclosure.

What is claimed is:

1. An image display system, comprising a light source, a light-splitting device and n display devices, n being an integer greater than or equal to 2,
   wherein the light source is configured to generate an initial light beam, and project the initial light beam to the light-splitting device;
   the light-splitting device is configured to split the initial light beam into n light beams with an identical light intensity, and project each of the light beams to a respective one of the display devices;

each of the display devices is configured to modulate the light beam projected from the light-splitting device, to display a predetermined region of a target image; and the predetermined regions displayed by the n display devices are combined into the target image, wherein the light-splitting device comprises at least one light-splitting assembly arranged sequentially in a predetermined direction;

a first light-splitting assembly of the at least one light-splitting assembly is configured to split a first transmission light beam generated from a second light-splitting assembly of the at least one light-splitting assembly into a first reflection light beam and a second transmission light beam, project the first reflection light beam to a corresponding display device, and project the second transmission light beam to a third light-splitting assembly;

the first light-splitting assembly is any one of the at least one light-splitting assembly other than a first-place light-splitting assembly and a last-place light-splitting assembly; and a distance between the first light-splitting assembly and the light source, a distance between the second light-splitting assembly and the light source and a distance between the third light-splitting assembly and the light source meet the following condition: b<a<c, where a represents the distance between the first light-splitting assembly and the light source, b represents the distance between the second light-splitting assembly and the light source, and c represents the distance between the third light-splitting assembly and the light source.

2. The image display system according to claim 1, wherein each light-splitting assembly is a beam splitter; and in the case that the light-splitting device comprises one beam splitter, a ratio of transmissivity to reflectivity of the beam splitter is equal to 1.

3. The image display system according to claim 1, wherein each light-splitting assembly is a beam splitter; and in the case that the light-splitting device comprises at least two beam splitters, a ratio of transmissivity to reflectivity of each of the beam splitters is not equal to 1, and reflection light beams generated from the beam splitters have an identical light intensity.

4. The image display system according to claim 1, further comprising:

a light-path conversion device configured to convert a light path of a transmission light beam generated from the last-place light-splitting assembly of the at least one light-splitting assembly, and project the transmission light beam whose light path has been converted to a corresponding display device.

5. The image display system according to claim 1, wherein the light source is a high-pressure mercury lamp, a metal halide lamp, a light-emitting diode (LED) lamp or a laser-excited fluorescent lamp.

6. An image display system, comprising a light source, a light-splitting device and n display devices, n being an integer greater than or equal to 2, wherein the light source is configured to generate an initial light beam, and project the initial light beam to the light-splitting device;

the light-splitting device is configured to split the initial light beam into n light beams with an identical light intensity, and project each of the light beams to a respective one of the display devices;

each of the display devices is configured to modulate the light beam projected from the light-splitting device, to display a predetermined region of a target image;

the predetermined regions displayed by the n display devices are combined into the target image;

each of the display devices comprises a light-beam modulation assembly, a light-path conversion assembly and an image display assembly;

the light-beam modulation assembly is configured to modulate the light beam projected from the light-splitting device, and project the modulated light beam to the light-path conversion assembly;

the light-path conversion assembly is configured to convert a light path of the modulated light beam, and project the modulated light beam whose light path has been converted to the image display assembly; and the image display assembly is configured to display the predetermined region of the target image in accordance with the modulated light beam whose light path has been converted.

7. The image display system according to claim 6, wherein the light-beam modulation assembly is an optical mechanism, and the light-path conversion assembly is a reflector.

8. The image display system according to claim 7, wherein the optical mechanism is of a single digital micromirror device structure or a triple liquid crystal display structure.

9. The image display system according to claim 6, wherein the image display assembly comprises a screen provided with a reflector, and the reflector is configured to reflect a light beam corresponding to the predetermined region of the target image displayed on the screen toward human eyes.

10. An image display method, comprising:

splitting, by a light-splitting device, an initial light beam from a light source into n light beams with an identical light intensity, n being an integer greater than or equal to 2;

projecting, by the light-splitting device, each of the light beams to a respective one of n display devices; and modulating, by each of the display devices, the light beam projected from the light-splitting device, to display a predetermined region of a target image, the predetermined regions displayed by the n display devices being combined into the target image, wherein the light-splitting device comprises at least one light-splitting assembly arranged sequentially in a predetermined direction;

the step of splitting by the light-splitting device the initial light beam from the light source comprises: splitting, by a first light-splitting assembly of the at least one light-splitting assembly, a first transmission light beam generated from a second light-splitting assembly of the at least one light-splitting assembly into a first reflection light beam and a second transmission light beam, the first transmission light beam being generated by the second light-splitting assembly in accordance with the initial light beam; projecting, by the first light-splitting assembly, the first reflection light beam to a corresponding display device; and projecting, by the first light-splitting assembly, the second transmission light beam to a third light-splitting assembly;

the first light-splitting assembly is any one of the at least one light-splitting assembly other than a first-place light-splitting assembly and a last-place light-splitting assembly; and a distance between the first light-splitting assembly and the light source, a distance between the second light-splitting assembly and the light source and a distance between the third light-splitting assembly and the light source meet the following condition: $b<a<c$, where a represents the distance between the first light-splitting assembly and the light source, b represents the distance between the second light-splitting assembly and the light source, and c represents the distance between the third light-splitting assembly and the light source.

11. The image display method according to claim 10, wherein
each light-splitting assembly is a beam splitter; and
in the case that the light-splitting device includes one beam splitter, a ratio of transmissivity to reflectivity of the beam splitter is equal to 1.

12. The image display method according to claim 10, wherein
each light-splitting assembly is a beam splitter; and
in the case that the light-splitting device includes at least two beam splitters, a ratio of transmissivity to reflectivity of each of the beam splitters is not equal to 1, and the reflection light beams generated from the beam splitters have an identical light intensity.

13. The image display method according to claim 10, wherein
in the case that the third light-splitting assembly is the last-place light-splitting assembly of the at least one light-splitting assembly, the step of projecting by the light-splitting device each of the light beams to the respective one of the n display devices comprises: converting, by a light-path conversion device, a light path of a transmission light beam generated from the third light-splitting assembly, and projecting the transmission light beam whose light path has been converted to a corresponding display device.

14. The image display method according to claim 10, wherein each of the display devices comprises a light-beam modulation assembly, a light-path conversion assembly and an image display assembly, and
the step of modulating by each display device the light beam projected from the light-splitting device to display the predetermined region of the target image comprises:
modulating, by the light-beam modulation assembly, the light beam projected from the light-splitting device, to acquire a modulated light beam;
projecting, by the light-beam modulation assembly, the modulated light beam to the light-path conversion assembly;
converting, by the light-path conversion assembly, a light path of the modulated light beam;
projecting, by the light-path conversion assembly, the modulated light beam whose light path has been converted to the image display assembly; and
displaying, by the image display assembly, the predetermined region of the target image in accordance with the modulated light beam whose light path has been converted.

15. The image display method according to claim 14, wherein the light-beam modulation assembly is an optical mechanism, and the light-path conversion assembly is a reflector.

16. The image display method according to claim 15, wherein the optical mechanism is of a single digital micromirror device structure or a triple liquid crystal display structure.

17. The image display method according to claim 14, wherein
the image display assembly comprises a screen provided with a reflector;
the step of displaying by the image display assembly the predetermined region of the target image in accordance with the modulated light beam whose light path has been converted comprises: displaying on the screen the predetermined region of the target image in accordance with the modulated light beam whose light path has been converted; and
subsequent to the step of displaying on the screen the predetermined region of the target image in accordance with the modulated light beam whose light path has been converted, the image display method further comprises: reflecting, by the reflector of the screen, a light beam corresponding to the predetermined region of the target image displayed on the screen toward human eyes.

18. The image display method according to claim 10, wherein the light source is a high-pressure mercury lamp, a metal halide lamp, a light-emitting diode (LED) lamp or a laser-excited fluorescent lamp.

* * * * *